US010810463B2

(12) United States Patent
Min et al.

(10) Patent No.: US 10,810,463 B2
(45) Date of Patent: Oct. 20, 2020

(54) UPDATING ATTRIBUTE DATA STRUCTURES TO INDICATE JOINT RELATIONSHIPS AMONG ATTRIBUTES AND PREDICTIVE OUTPUTS FOR TRAINING AUTOMATED MODELING SYSTEMS

(71) Applicants: Xinyu Min, Atlanta, GA (US); Jeffrey Qijia Ouyang, Atlanta, GA (US); EQUIFAX, INC., Atlanta, GA (US)

(72) Inventors: Xinyu Min, Atlanta, GA (US); Jeffrey Qijia Ouyang, Atlanta, GA (US)

(73) Assignee: EQUIFAX INC., Atlanta, GA (US)

(*) Notice: Subject to any disclaimer, the term of this patent is extended or adjusted under 35 U.S.C. 154(b) by 0 days.

(21) Appl. No.: 16/331,948

(22) PCT Filed: Sep. 8, 2017

(86) PCT No.: PCT/US2017/050672
§ 371 (c)(1),
(2) Date: Mar. 8, 2019

(87) PCT Pub. No.: WO2018/049154
PCT Pub. Date: Mar. 15, 2018

(65) Prior Publication Data
US 2019/0220705 A1    Jul. 18, 2019

Related U.S. Application Data

(60) Provisional application No. 62/385,383, filed on Sep. 9, 2016.

(51) Int. Cl.
*G06K 9/62* (2006.01)
*G06F 16/24* (2019.01)
(Continued)

(52) U.S. Cl.
CPC ......... *G06K 9/6257* (2013.01); *G06F 16/213* (2019.01); *G06F 16/2465* (2019.01);
(Continued)

(58) Field of Classification Search
CPC .................. G06K 9/6257; G06K 9/6231; G06F 16/2465; G06F 16/213; G06N 20/00; G06N 5/025
See application file for complete search history.

(56) References Cited

U.S. PATENT DOCUMENTS 5,461,699 A    10/1995  Arbabi et al.
8,458,074 B2 *  6/2013  Showalter .............. G06Q 40/02
                                                    705/1.1
(Continued)

FOREIGN PATENT DOCUMENTS

WO    2015179778    11/2015
WO    2018049154    3/2018

OTHER PUBLICATIONS

Koh Hian Chye, Tan Wei Chin, Goh Chwee Peng, "Credit Scoring Using Data Mining Techniques", 2004, Singapore Management Review, vol. 26 No. 2., pp. 1, 25-47 (Year: 2004).*
(Continued)

*Primary Examiner* — Eric Nilsson
*Assistant Examiner* — Urmana Islam
(74) *Attorney, Agent, or Firm* — Kilpatrick Townsend & Stockton LLP

(57) ABSTRACT

Attribute data structures can be updated to indicate joint relationships among attributes and predictive outputs in training data that can be used for training automated modeling system. A data structure that stores training data for training an automated modeling algorithm can be accessed. The training data can include first data for a first attribute and second data for a second attribute. The data structure can be modified to include a derived attribute that indicates a
(Continued)

joint relationship among the first attribute, the second attribute, and a predictive output variable. The automated modeling algorithm can be trained with the first attribute, the second attribute, and the derived attribute.

20 Claims, 8 Drawing Sheets

(51) Int. Cl.
  *G06F 16/21* (2019.01)
  *G06N 5/02* (2006.01)
  *G06N 20/00* (2019.01)
  *G06F 16/2458* (2019.01)

(52) U.S. Cl.
  CPC ........... *G06K 9/6231* (2013.01); *G06N 5/025* (2013.01); *G06N 20/00* (2019.01)

(56) References Cited

U.S. PATENT DOCUMENTS

| | | | |
|---|---|---|---|
| 9,076,107 B2 | 7/2015 | Cameron et al. | |
| 9,336,483 B1 | 5/2016 | Abeysooriya et al. | |
| 9,342,793 B2 | 5/2016 | Williamson | |
| 9,582,781 B1* | 2/2017 | Kearns | G06N 20/00 |
| 2003/0101451 A1* | 5/2003 | Bentolila | G06Q 30/0254 |
| | | | 725/34 |
| 2007/0011114 A1 | 1/2007 | Chen et al. | |
| 2009/0239229 A1* | 9/2009 | Weaver | C12Q 1/6886 |
| | | | 435/6.12 |
| 2011/0184898 A1 | 7/2011 | Lan et al. | |
| 2012/0150764 A1 | 6/2012 | Sadegh | |
| 2014/0156568 A1 | 6/2014 | Ganguly et al. | |
| 2015/0074021 A1 | 3/2015 | Cao et al. | |
| 2015/0161522 A1 | 6/2015 | Saon et al. | |
| 2015/0170056 A1 | 6/2015 | Breckenridge et al. | |
| 2016/0132787 A1 | 5/2016 | Drevo et al. | |
| 2017/0262635 A1* | 9/2017 | Strauss | G06F 21/577 |

OTHER PUBLICATIONS

Milad Malekipirbazari, Vural Aksakalli, "Risk assessment in social lending via random forests", Feb. 14, 2014, Istanbul Sehir University, Istanbul 34662, Turkey, pp. 4621-4631 (Year: 2014).*
Nan-Chen Hsieh, Lun-Ping Hung, "A data driven ensemble classifier for credit scoring analysis", Jan. 2010, Expert Systems with Applications 37, pp. 534-545 (Year: 2010).*
PCT/US2017/050672 , "International Search Report and Written Opinion", dated Jan. 3, 2018, 9 pages.
Agrawal et al., "Mining Association Rules between Sets of Items in Large Databases"; IBM Almaden Research Center, http://www.it.uu.se/edu/course/homepage/infoutv/ht08/agrawal93mining.pdf, pp. 1-10.
Borgelt, http://www.borgelt.net/software.html, pp. 1-3.
Goethals, http://adrem.uantwerpen.be/~goethals/software/, p. 1.
A C++ Frequent Itemset Mining Template Library, http://www.cs.bme.hu/~bodon/en/fim_env/index.html, pp. 1-5.
Hahsler, Research on Association Rules, http://michael.hahsler.net/research/association_rules/, pp. 1-8.
Qualls et al. "Introduction to Market Basket Analysis", Paper AA07-2013, Jul. 20, 2013, pp. 1-20.

* cited by examiner

UPDATING ATTRIBUTE DATA STRUCTURES TO INDICATE JOINT RELATIONSHIPS AMONG ATTRIBUTES AND PREDICTIVE OUTPUTS FOR TRAINING AUTOMATED MODELING SYSTEMS

CROSS REFERENCE TO RELATED APPLICATIONS

This disclosure claims the benefit of priority of U.S. Provisional Application No. 62/385,383, titled "Updating Attribute Data Structures to Indicate Joint Relationships Among Attributes and Predictive Outputs for Training Automated Modeling Systems" and filed on Sep. 9, 2016, which is hereby incorporated in its entirety by this reference.

TECHNICAL FIELD

This disclosure generally relates to digital data processing systems and methods for emulation of decision-making and other intelligence, and more particularly relates to updating attribute data structures to indicate joint relationships among attributes and predictive outputs in training data that is used for training automated modeling systems.

BACKGROUND

Automated modeling systems implement automated modeling algorithms (e.g., algorithms using modeling techniques such as logistic regression, neural networks, support vector machines, etc.) that are trained using large volumes of training data. This training data, which can be generated by or otherwise indicate certain electronic transactions or circumstances, is analyzed by one or more computing devices of an automated modeling system. The training data is grouped into attributes that are provided as inputs to the automated modeling system. The automated modeling system can use this analysis to learn from and make predictions regarding similar electronic transactions or circumstances. For example, the automated modeling system uses the attributes to learn how to generate predictive outputs involving transactions or other circumstances similar to the attributes from the training data.

The accuracy with which an automated modeling algorithm learns to make predictions of future actions can depend on the data attributes used to train the automated modeling algorithm. For instance, larger amounts of training data (e.g., more data samples, more attributes, etc.) allow the automated modeling algorithm to identify different scenarios that may affect a predictive output, to increase the confidence that a trend associated with the training data has been properly identified, or both. Thus, if an automated modeling algorithm uses, as inputs, a larger number of attributes having some predictive relationship with a predictive output, the accuracy of the predictive output increases.

SUMMARY

Aspects and examples are disclosed for updating attribute data structures to indicate joint relationships among attributes and predictive outputs in training data that is used for training automated modeling systems. In some aspects, a system, which can include a processing device and a memory device storing executable instructions, can access a data structure. The data structure can store training data for training an automated modeling algorithm and the training data can include first data for a first attribute and second data for a second attribute. The processing device can modify the data structure to include a derived attribute that indicates a joint relationship among the first attribute, the second attribute, and a predictive output variable. The first data and the second data can be grouped into data bins. Each data bin can be defined by a respective subset of values of the first attribute and a respective subset of values of the second attribute. A respective number of data samples, for each data bin, can be identified within the data bin having a specified predictive output value of the predictive output variable. A training dataset an be generated for the derived attribute based on a subset of the data bins. The subset of data bins can be selected based on the respective number of data samples within the data bins having the specified predictive output value of the predictive output variable. The processing device can further train the automated modeling algorithm with the first attribute, the second attribute, and the derived attribute.

This illustrative example is mentioned not to limit or define the inventions, but to aid understanding thereof. Other aspects, advantages, and features of the present invention will become apparent after review of the entire description and figures.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
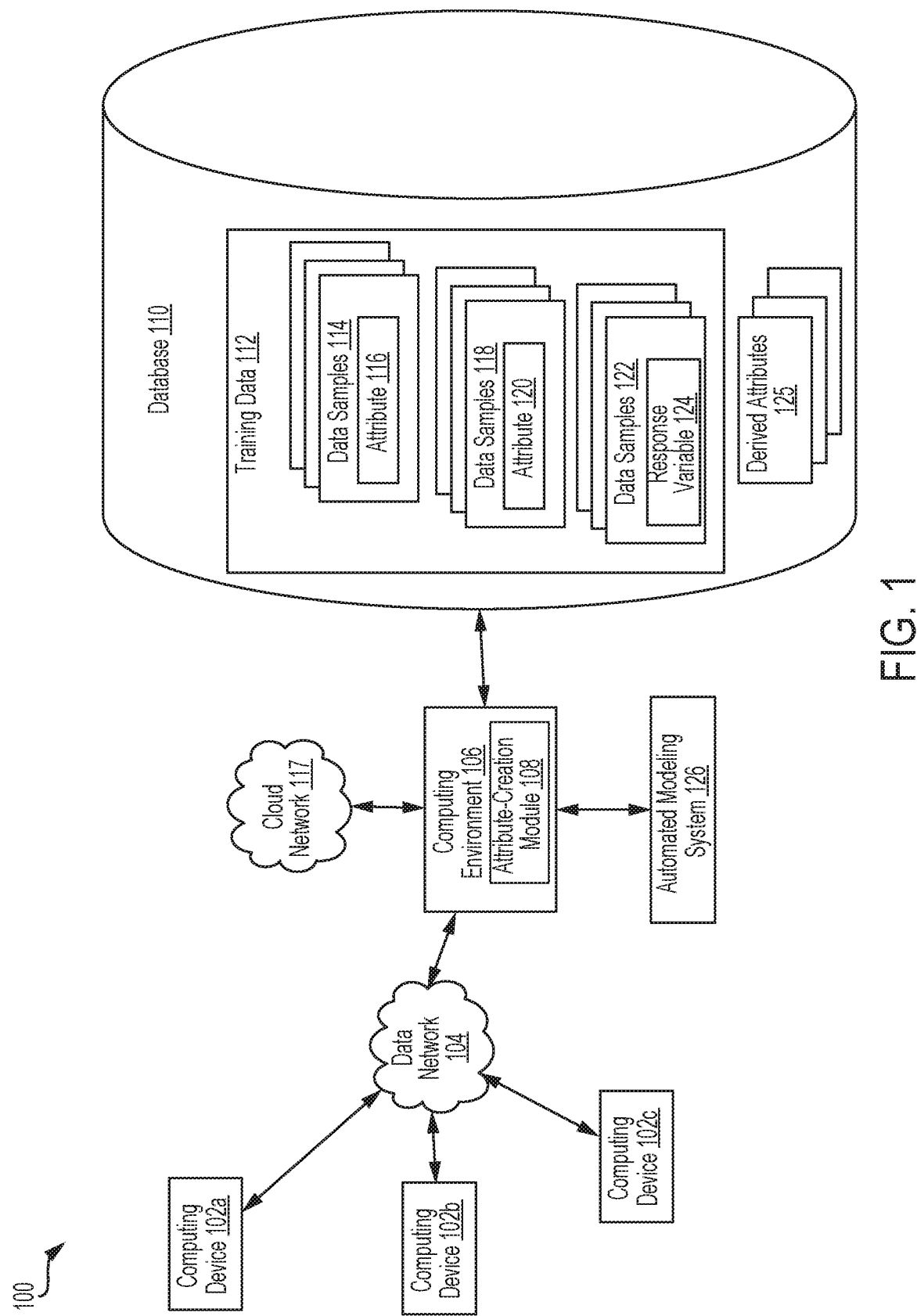
FIG. 1 depicts an example of a computing system that is usable for creating derived attributes for training automated modeling algorithms or other machine-learning algorithms according to one aspect of the present disclosure.

Certain aspects of this disclosure describe updating attribute data structures, where a modified attribute data structure indicates joint relationships among attributes and response variables (e.g., predictive output variables). For instance, certain attributes can indicate behaviors of individuals. An attribute data structure can include a database or other data structure that is used to store data samples with values of different attributes. In some aspects, an attribute data structure also stores values of one or more predictive output variables or other response variables that are associated with attributes. Certain aspects can improve these systems by creating a derived attribute from multiple individual attributes. The derived attribute can indicate a joint impact of individual attributes on a certain response variable. For example, in addition to two individual attributes being considered in a training process for an automated modeling algorithm (e.g., a neural network), an interaction between the two attributes can also be considered in the training process. An attribute data structure can be updated to include values for these derived attributes. The updated data structure can be used to train the automated modeling algorithm.

In some aspects, one or more of the computing systems described herein can assign a reason code to a derived attribute as used in an automated modeling algorithm. A reason code can indicate an impact of an attribute on a predictive variable output or other response variable attribute in the automated modeling algorithm. Regulatory requirements may require reason codes to be assignable to some or all attributes that are used in an automated modeling algorithm. But, in the absence of the attribute-creation module described herein, an automated modeling system or other computing system may be unable to assign reason codes to interaction variables (e.g., a product of two independent variables) even if these interaction variables can be inputted by modelers into a given predictive model. The attribute-creation module allows reason codes to be assigned to derived attributes, which indicate interactions between two or more attributes, that would not otherwise be feasibly assignable to interaction attributes that a modeler may add to an automated modeling algorithm.

In some aspects, the derived attribute can capture or otherwise represent potential interactions between individual attributes that are used to generate the derived attribute. In some aspects, the derived attribute, by capturing high-dimensional comprehensive information derived from a group of attributes, can enhance the performance of an automated modeling algorithm. In additional or alternative aspects, incorporating derived attributes into an automated modeling algorithm can improve model performance (e.g., Kolmogorov-Smirnov ("KS") scores and capture rates) in various risk assessment use cases and other use cases.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Operating Environment Example

Referring now to the drawings, FIG. 1 depicts an example of a computing system 100 that is usable for creating derived attributes for training automated modeling algorithms or other machine-learning algorithms. FIG. 1 depicts examples of hardware components of a computing system 100 according to some aspects. The computing system 100 is a specialized computing system that may be used for processing large amounts of data using a large number of computer processing cycles.

The computing system 100 may include a computing environment 106. The computing environment 106 may be a specialized computer or other machine that processes the data received within the computing system 100. The computing environment 106 may include one or more other systems. For example, the computing environment 106 may include a database system for accessing network-attached data stores, a communications grid, or both. A communications grid may be a grid-based computing system for processing large amounts of data.

The computing system 100 may also include one or more network-attached data stores for storing a database 110 or other suitable attribute data structure. An attribute data structure can be any data structure suitable for storing data samples that have values for one or more attributes, one or more predictive output values associated with the attributes, or both. Network-attached data stores can include memory devices for storing training data 112 to be processed by the computing environment 106. (In some aspects, the network-attached data stores can also store any intermediate or final data generated by one or more components of the computing system 100.) The training data 112 can be provided by one or more computing devices 102a-c, generated by computing devices 102a-c, or otherwise received by the computing system 100 via a data network 104. Although a database 110 is described herein as an example of a data structure for storing the training data 112, the attribute-creation module 108 may be used to modify any data structure suitable for storing training data that is grouped into attributes.

The training data 112 can include data samples 114 having values for an attribute 116, data samples 118 having values for an attribute 120, and data samples 122 having values for a response variable 124 (e.g., a predictive output variable such as (e.g., a consumer credit risk computed from credit-related attributes)). For example, a large number of observations can be generated by electronic transactions, where a given observation includes one or more attributes (or data from which an attribute can be computed or otherwise derived) and data for one or more predictive output variables or other response variables (or data from which a response variable value can be computed or otherwise derived). An automated modeling algorithm can use the training data 112 to learn relationships between attributes and one or more predictive output variables or other response variables.

Network-attached data stores used in the system 100 may also store a variety of different types of data organized in a variety of different ways and from a variety of different sources. For example, network-attached data stores may include storage other than primary storage located within computing environment 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The computing environment 106 can include one or more processing devices that execute program code, which includes an attribute-creation module 108 and is stored on a non-transitory computer-readable medium. The attribute-creation module 108 can generate a derived attribute 125 by applying one or more derivation operations to a group of attributes, such as a set of attributes 116 and 120. Examples of derivation operations are described herein with respect to FIG. 4.

The computing system 100 may also include one or more automated modeling systems 126. The computing environment 106 may route select communications or data to the automated modeling systems 126 or one or more servers within the automated modeling systems 126. An example of an automated modeling system 126 is a mainframe computer, a grid computing system, or other computing system that executes an automated modeling algorithm (e.g., an algorithm using logistic regression, neural networks, etc.) that can learn or otherwise identify relationships between attributes and response variables (e.g., predictive output variables).

Automated modeling systems 126 can be configured to provide information in a predetermined manner. For example, automated modeling systems 126 may access data to transmit in response to a communication. Different automated modeling systems 126 may be separately housed from each other device within the computing system 100, such as computing environment 106, or may be part of a device or system. Automated modeling systems 126 may host a variety of different types of data processing as part of the computing system 100. Automated modeling systems 126 may receive a variety of different data from the computing devices 102a-c, from the computing environment 106, from cloud network 117, or from other sources.

The computing system 100 can also include one or more computing devices 102a-c. The computing devices 102a-c may include client devices that can communicate with the computing environment 106. For example, the computing devices 102a-c may send data to the computing environment 106 to be processed, may send signals to the computing environment 106 to control different aspects of the computing environment or the data it is processing. The computing devices 102a-c may interact with the computing environment 106 via one or more networks 104.

The computing devices 102a-c may include network computers, sensors, databases, or other devices that may transmit or otherwise provide data to computing environment 106. For example, the computing devices 102a-c may include local area network devices, such as routers, hubs, switches, or other computer networking devices.

The computing system 100 may also include one or more cloud networks 117. A cloud network 117 may include a cloud infrastructure system that provides cloud services. In certain examples, services provided by the cloud network 117 may include a host of services that are made available to users of the cloud infrastructure system on demand. A cloud network 117 is shown in FIG. 1 as being connected to computing environment 106 (and therefore having computing environment 106 as its client or user), but cloud network 117 may be connected to or utilized by any of the devices in FIG. 1. Services provided by the cloud network 117 can dynamically scale to meet the needs of its users. The cloud network 117 may include one or more computers, servers, or systems. In some aspects, one or more end-user devices can access the computing environment 106, network-attached data stores included in the system 100, the automated modeling system 126, or some combination thereof via the cloud network 117.

The numbers of devices depicted in FIG. 1 are provided for illustrative purposes. Different numbers of devices may be used. For example, while each device, server, and system in FIG. 1 is shown as a single device, multiple devices may instead be used.

Each communication within the computing system 100 (e.g., between client devices, between automated modeling systems 126 and computing environment 106, or between a server and a device) may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

Attribute-Creation Implementation Example

The following examples of creating derived attributes are provided for illustrative purposes. These illustrative examples involve creating derived attributes from credit-related attributes that are used by an automated modeling system to generate risk assessments (e.g., credit scores) or other predictive outputs regarding individuals or other entities. In automated modeling systems that use credit-related data, attributes can be incorporated as independent predictors into an automated modeling algorithm (e.g., a modeling algorithm that uses a logistic regression model). But the automated modeling algorithm may not adequately account for interactions within groups of attributes (e.g., interactions between a "credit utilization" attribute and a "credit limit attribute").

The attribute-creation module 108 can generate a derived attribute by applying one or more derivation operations using a group of two or more attributes as inputs. The derived attribute can represent the joint impact of the group of attributes on credit-related performance or other risk assessments. The derived attribute can also capture potential interactions between individual attributes. In some aspects, the derived attribute, by capturing high-dimensional, comprehensive information derived from a group of attributes, can enhance the performance of a credit model or other automated modeling algorithm.

Figures 2, 3:
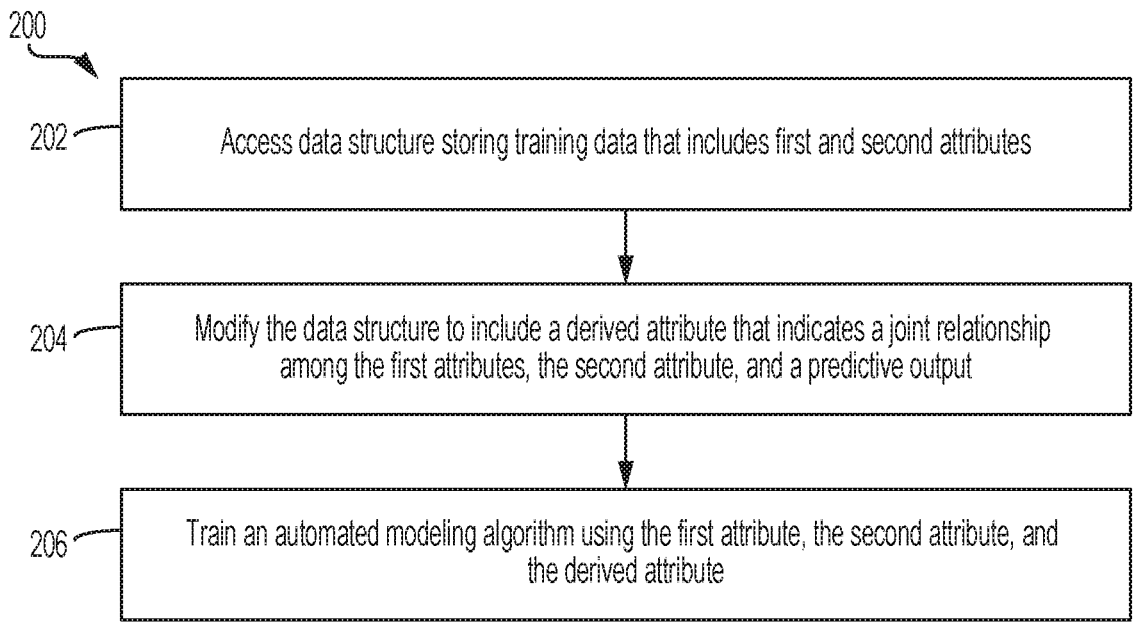
FIG. 2 depicts an example of a process for using derived attributes that may be provided as inputs for training or otherwise using an automated modeling algorithm according to one aspect of the present disclosure.
FIG. 3 depicts an example of a set of data samples for an attribute according to one aspect of the present disclosure.

FIG. 2 is a flow chart depicting an example of a process 200 for using derived attributes that may be provided as inputs for training or otherwise using an automated modeling algorithm. For illustrative purposes, the process 200 is described with reference to the implementation depicted in FIG. 1 and various other examples described herein. But other implementations are possible.

The process 200 can involve accessing a data structure for storing training data that includes a first attribute and a second attribute, as depicted in block 202. For example, the attribute-creation module 108 can be executed by one or more suitable processing devices to access the training data 112. The training data 112 is grouped into multiple attributes, such as the attributes 116 and 120. Any number of suitable attributes can be included in the training data 112. In one example, a set of training data 112 can include data samples for 500 or more attributes. In another example, a set of training data 112 can include data samples for 1142 attributes. In some aspects, the training data 112 also includes one or more response variables 124.

The process 200 can also involve modifying the data structure to include a derived attribute that indicates a joint relationship among the first attributes, the second attribute, and a predictive output, as depicted in block 204. For example, the attribute-creation module 108 can be executed by one or more processing devices to generate a derived attribute 125 from the two attributes 116, 120. An example of a process for creating a derived attribute from two or more other attributes is described herein with respect to FIG. 4.

The process 200 can also involve training the automated modeling algorithm with the first attribute, the second attribute, and the derived attribute as depicted in block 206. For example, the attribute-creation module 108 can be executed by one or more processing devices to output a training dataset for the derived attribute 125. The computing environment 106 can update the training data 112 to include the training dataset for the derived attribute 125. The computing environment 106 can transmit the updated training data 112 to the automated modeling system 126. The automated modeling system 126 can train an automated modeling algorithm (e.g., a modeling algorithm using logistic regression, a neural network, a support vector machine, etc.) using both the training dataset for the derived attribute 125 as well as portions of the training data 112 for the attributes 116, 120.

In some aspects, using the derived attribute 125 can allow the automated modeling algorithm to learn which attributes, in combination, are likely to contribute to a given predictive output value for a predictive output variable when each attribute's value falls within a certain range. In a simplified example, two attributes may be credit utilization and credit limit, and a predictive output variable may be a delinquency on a debt. In this example, a derived attribute can indicate that the likelihood of delinquency is increased for certain combinations of values of credit utilization and credit limit (e.g., high credit utilization and low credit limit). The derived attribute can also indicate that the likelihood of delinquency is unaffected for other combinations of values of credit utilization and credit limit (e.g., high credit utilization and high credit limit, low credit utilization and high credit limit, etc.).

In some aspects, the attribute-creation module 108 can create derived attributes 125 by applying a supervision feature to machine-learning techniques that would otherwise operate without supervision. For instance, the attribute-creation module 108 can use a modified version of association rule mining, which systems other than those described herein may use in an unsupervised manner.

Association rule mining can include finding frequent combinations of attributes in a set of data and identifying patterns among the attributes. For instance, a dataset can include at least some data items having attributes A, B, and C. An algorithm implementing association rule mining can identify frequent combinations of attributes A and B. The association rule mining algorithm can compute a "support" for the "A, B" combination that is the probability of data items having both attributes A and B occurring in the dataset. The association rule mining algorithm can also discover trends in the dataset, such as the likelihood of an A-B combination occurring with an occurrence of the C attribute. The association rule mining algorithm can compute a "confidence" for this "C|A, B" trend. An example of a function for computing this confidence score is:

$$P(C \mid A, B) = \frac{P(A, B, C)}{P(A, B)}.$$

In this function, $P(C \mid A, B)$ is the confidence score for a trend in which the presence of A and B indicates the presence of C, $P(A, B, C)$ is the probability of data items having all three attributes (A, B, and C) occurring in the dataset, and $P(A, B)$ is the probability of data items having both attributes A and B occurring in the dataset.

FIG. 3 depicts a simplified example of data samples for an attribute. This simplified example involves food purchased in a shopping cart, where association rule mining can be used to identify trends associated with the purchase of certain items. The table 310 includes an "ID" column for an anonymous identifier of an individual or other entity (e.g., a consumer) whose actions were used to generate the data samples for the food purchased in a shopping cart. In this example, the table 310 includes identifiers for 14 entries, but any number of identifiers can be implemented.

The attribute-creation module 108 can detect a frequent combination of attributes. In this example, a frequent combination can include {peanut butter, jelly} 320. 57.1% of the customers purchased {peanut butter, jelly} 320. This statistic can also be represented as the support for {peanut butter, jelly} 320 or the probability that {peanut butter, jelly} appears in the population of data samples. In this example, 87.5% of customers who purchased {peanut butter, jelly} 320 also purchased {bread} 330. This statistic can also be represented as the confidence that a customer that purchases {peanut butter, jelly} 320 will also purchase {bread} 330 or the probability of {peanut butter, jelly, bread} divided by the probability of {peanut butter, jelly} 320.

In some aspects, the attribute-creation module 108 uses a modified version of association rule mining. The modified version of association rule mining, rather than merely learning trends that involve combination of attributes (as in the examples depicted in FIG. 3), can include learning trends that involve combinations of attributes and response variables (e.g., predictive outputs). For example, the attribute-creation module 108 can receive data for multiple attributes and response variables. Rather than using an existing attribute as an association rule (e.g., attribute C being associated with an "A, B" combination), the modified version of association rule mining uses a dependent variable as the association rule (e.g., a dependent variable Y being associated with an "A, B" combination).

Figures 4, 5, 6, 7:
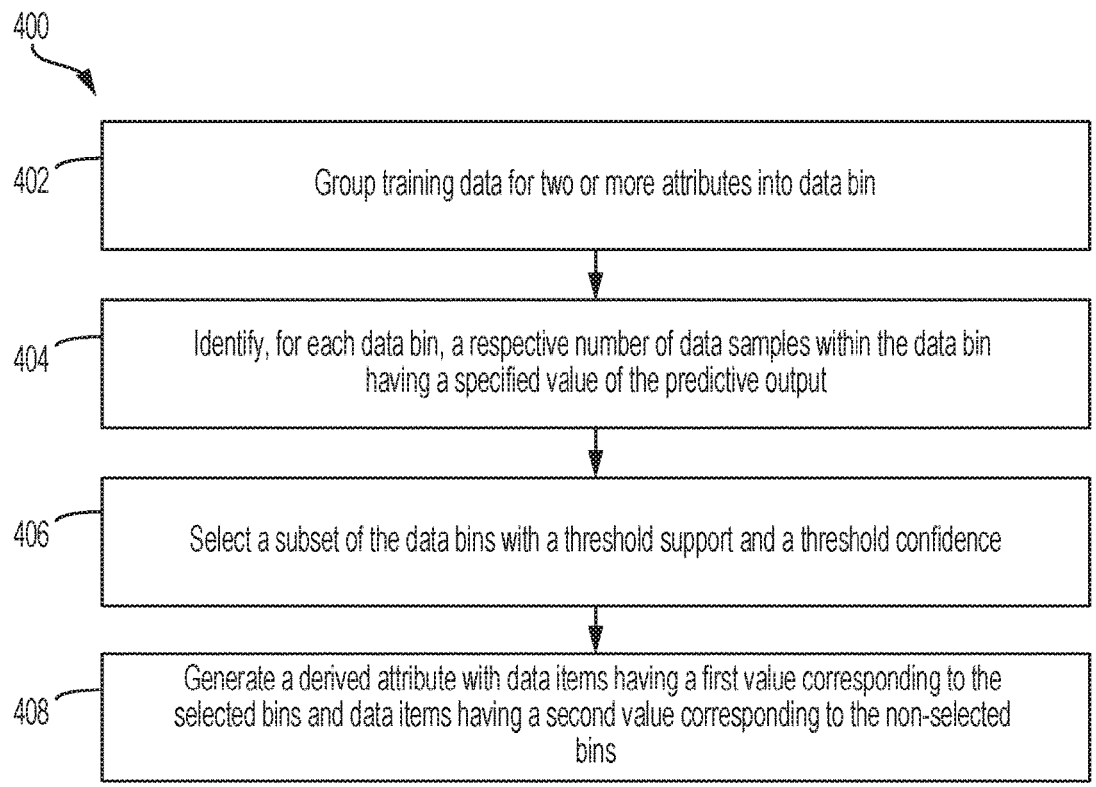
FIG. 4 depicts an example of a process for updating an attribute data structure to include a derived attribute that is generated from two or more other attributes according to one aspect of the present disclosure.
FIG. 5 depicts an example of data bins for an attribute associated with a continuous set of values that can be transformed into an ordinal attribute according to one aspect of the present disclosure.
FIG. 6 depicts an example of data bins for an attribute associated with a discrete set of values that can be transformed into an ordinal attribute according to one aspect of the present disclosure.
FIG. 7 depicts an example of data bins for an attribute associated with a binary set of values that can be transformed into an ordinal attribute according to one aspect of the present disclosure.

FIG. 4 is a flow chart depicting an example of a process 400 for updating an attribute data structure (e.g., database 110 that includes training data 112 organized into attributes) to include a derived attribute that is generated from two or more other attributes. The derived attribute indicates a relationship among the attributes used to derive the attribute and a predictive output. In some aspects, the attribute-creation module 108 can be executed by one or more processing devices to perform the process 400 for multiple combinations of attributes in the training data 112 (e.g., each available two-attribute combination). The performance of the process 400 using multiple combinations of attributes can generate multiple derived attributes. For illustrative purposes, the process 400 is described with reference to the implementations and examples described herein. But other implementations are possible.

In block 402, the attribute-creation module 108 can group training data for two or more attributes under consideration into data bins. Each data bin includes a portion of the training data for a combination of different attribute value ranges for the subset of attributes. The data bin has multiple dimensions, where a dimension is contributed by a respective one of the attributes that is used to generate the data bin. In a simplified example, a subset of attributes may include two attributes, where each attribute has a range of values (e.g., 1-10) with multiple sub-ranges (e.g., 1-3, 3-5, 5-7, 7-10). A given data bin can be the training data for two intersecting sub-ranges from the two attributes. Thus, a first bin can be defined by training data within the "1-3" sub-range of the first attribute and the "1-3" sub-range of the second attribute, a second bin can be defined by training data within the "1-3" sub-range of the first attribute and the "3-5" sub-range of the second attribute, a third bin can be defined by training data within the "3-5" sub-range of the first attribute and the "3-5" sub-range of the second attribute, and so on.

In a simplified example, attributes 116 and 120, which can be used by the attribute-creation module 108, include a credit utilization attribute and a credit limit attribute. The training data 112 can include data samples 114 that include different credit utilization values, each of which is indexed to a respective identifier. The training data 112 can include data samples 118 that include different credit limit values, each of which is also indexed to a respective identifier. An identifier to which a data sample is indexed may allow the data sample to be associated with a particular consumer (e.g., a consumer with anonymous identifier "123XYZ") whose activities were used to generate the data sample, even if the identity of that consumer cannot be obtained from the identifier.

In some aspects, the attribute-creation module 108 can sort each attribute according to its numerical values (e.g., the values of "credit limit" and "credit utilization" in the data samples 114, 118). The attribute-creation module 108 can create ordinal attributes from the numerical attributes. An ordinal attribute has a set of possible data values that represent an order, rank, or position (e.g., a set of values representing a "lowest" quartile, a "low" quartile, a "high" quartile, and a "highest quartile"). A numerical attribute has a set of possible numerical values (e.g., any of a continuous range of values between two end points, any of a discrete set of integers between two end points, either of two values in a binary set of values, etc.).

FIGS. 5-7 depict examples of tables 510, 610, 710 for transforming numerical attributes into ordinal attributes. In these examples, an ordinal attribute is an attribute having a set of possible data values that represent a bin for a given attribute. For example, in FIG. 5 an attribute associated with a continuous set of values (e.g., a percentage between 0 and 100%) can be transformed into an ordinal attribute associated with a set of four values (e.g., values respectively representing the bin labels "lowest value," "low," "high," and "highest value"). For this numerical attribute, an attribute value of less than 25 is assigned to the bin "lowest value" (e.g., by transforming the numerical attribute value of less than 25 into the ordinal attribute value representing "lowest value"), an attribute value from 25 to 50 is assigned to the bin "low value" (e.g., by transforming the numerical attribute value that is between 25 and 50 into the ordinal attribute value representing "low value"), and so on.

In FIG. 6, an attribute associated with a discrete set of values (e.g., a value selected from the set of [0, 1, 2, 3, . . . 100]) can be transformed into an ordinal attribute associated with a set of four values (e.g., values respectively representing the bin labels "lowest value," "low," "high," and "highest value"). For this numerical attribute, an attribute value of zero is assigned to the bin "lowest value" (e.g., by transforming the numerical attribute value of zero into the ordinal attribute value representing "lowest value"), an attribute value from the subset [1, 2, . . . 50] is assigned to the bin "low value" (e.g., by transforming the numerical attribute value into the ordinal attribute value representing "low value"), and so on. In FIG. 7, a binary attribute having a value of 0 or 1 can be transformed into an ordinal attribute associated with a set of two values (e.g., values respectively representing the bin labels "low" and "high").

The binning example depicted in FIG. 5-6, which divides each set of attribute values into quartile and the binning example depicted in FIG. 7, which divides each set of attribute values into halves, is provided for illustrative purposes only. Other numbers of bins, other bin sizes, or both can be used.

The data bins of block 402 can be generated from intersections of ordinal attributes. In a simplified example that is depicted in FIG. 8, a first ordinal attribute $x_1$ may be associated with a set of value ranges (e.g., [0-1, 1-2, 2-3, 3-4]) that respectively represent bin labels "lowest value," "low," "high," and "highest value." A second ordinal attribute $x_2$ may be associated with a set of value ranges (e.g., [0-1, 1-2, 2-3, 3-4]) that respectively represent bin labels "lowest value," "low," "high," and "highest value." Each of the sixteen data bins depicted in FIG. 7 corresponds to a pair of ordinal attribute values (e.g., a first block for ordinal attribute $x_1$ being "lowest" and ordinal attribute $x_2$ being "lowest," a second block for ordinal attribute $x_1$ being "lowest" and ordinal attribute $x_2$ being "low," and so on).

Returning to FIG. 4, in block 404, the attribute-creation module 108 can identify, for each data bin, a respective number of data samples within the data bin having a specified value of the predictive output. The attribute-creation module 108 can be executed by one or more processing devices to identify the specified predictive output value based on, for example, a user input received from one or more of the computing device 102a-c. The number of data samples having the specified predictive output value can be used to calculate the confidence associated with a given data bin.

Figure 8:
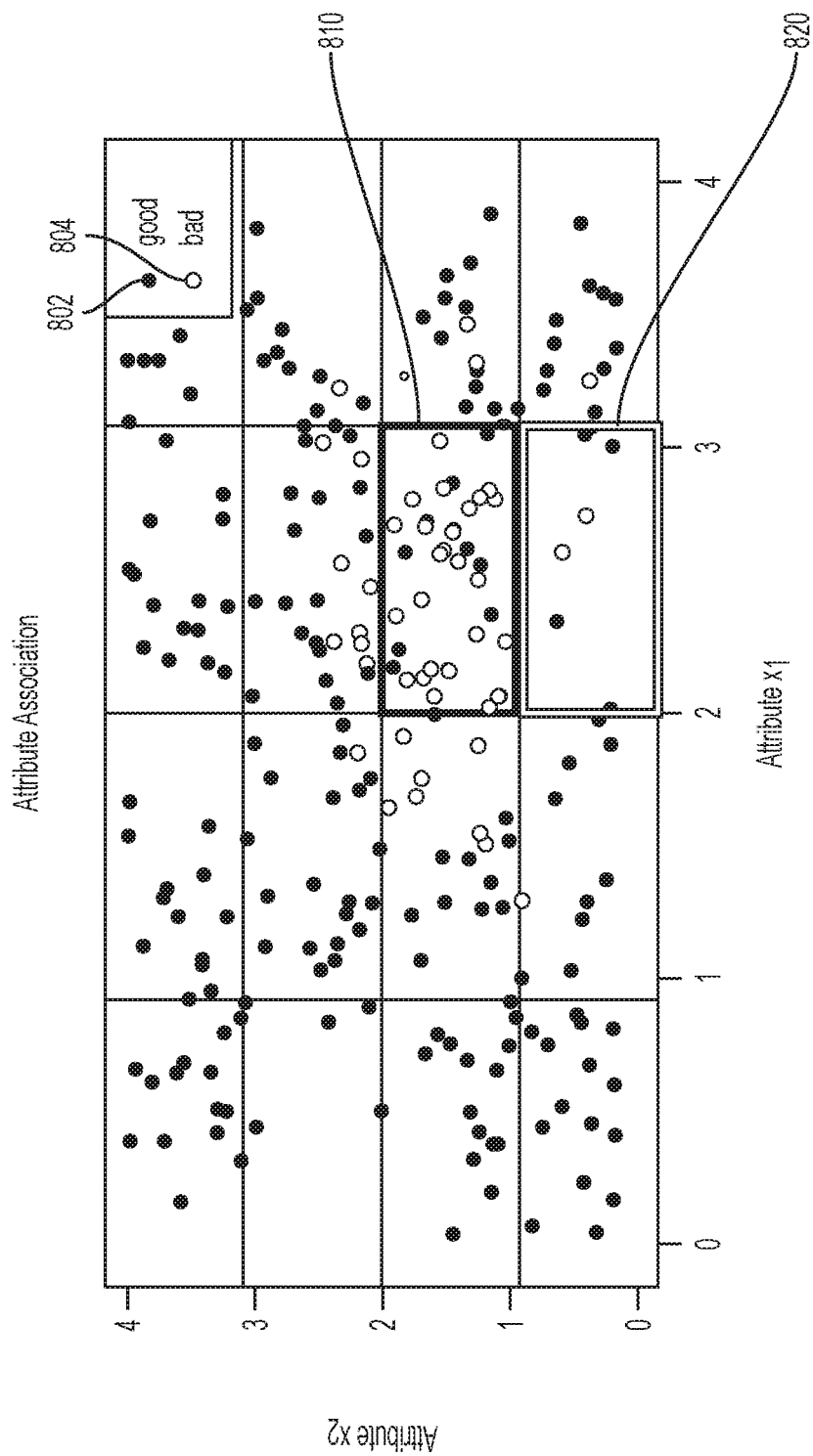
FIG. 8 depicts an example of data bins generated from intersections of ordinal attributes according to one aspect of the present disclosure.

In the simplified example depicted in FIG. 8, data samples are depicted as solid dots 802 and open dots 804. Each of the dots 802, 804 corresponds to a subset of the data samples having a combination of values for first and second attributes, where the combination of values falls within a given set of intersecting ranges (e.g., the values ranges transformed into the different data bins depicted in FIG. 8), that corresponds to one of two predictive output values. In this example, a "bad" value for the predictive output is represented by an open dot 804, and a "good" value for the predictive output is represented by a solid dot 802. An example of a "bad" value is a customer being delinquent on a debt within two years, and an example of a "good" value is a customer avoiding delinquency on a debt within two years. But other transactions represented by other values can be used with the attribute-creation module 108.

Returning to FIG. 4, in block 406, the attribute-creation module 108 can select a subset of the data bins with a threshold support and a threshold confidence. A threshold support for a selected data bin can be, for example, the data bin having a threshold number of data samples. The threshold support can indicate that enough of the data samples are concentrated in a given bin for trends in predictive output values to be determined using the bin. A threshold confidence for a selected data bin can be, for example, the data bin having a threshold ratio between (i) data samples with the specified value of the predictive output and (ii) a total number of data samples within the data bin. The threshold confidence can indicate that a bin includes enough data samples having a specified value of a predictive output variable (or other response variable) to determine an association between the data bin and the specified predictive output value.

In block 408, the attribute-creation module 108 can generate a derived attribute (e.g., the derived attribute of block 204 in FIG. 2) in which certain data items have a first value of the derived attribute corresponding to the selected bins and other data items have a second value of the derived attribute corresponding to the non-selected bins. In some aspects, the derived attribute can be a binary attribute. A value of "1" for the binary attribute can indicate that a combination of a first attribute value and a second attribute value is associated with the specified value of the predictive output.

In some aspects, generating the derived attribute involves generating a training dataset for the derived attribute. If the derived attribute is binary, each data item in the training dataset has a first value or a second value. The training dataset can include multiple data items, where some data items have the first value for a binary derived attribute and other data items have the second value for the binary derived attribute. The first value can indicate a presence of the specified predictive output value for a selected data bin in the subset of the data bins corresponding to first combinations of values of the first attribute and the second attribute. The second value can indicate an absence of the specified predictive output value for one or more non-selected data bins that correspond to second combinations of values of the first attribute and the second attribute.

For instance, a derived attribute X may be a binary attribute whose value is determined by the following function:

If $x_1$="high" and $x_2$="low", then X=1,
Else X=0.

The value X for certain pairs of values of $x_1$ (e.g., attribute 116) and $x_2$ (e.g., attribute 120) indicates that for certain ranges of attributes 116 and 120 (which correspond to the bins that provide the values of $x_1$ and $x_2$), a specified predictive output value will result. Thus, in certain aspects, certain data items for a derived attribute can have a first value indicating that the specified predictive output value is present if the first and second attributes have values corresponding to one of the selected data bins (e.g., a pair of attribute values falling within one of the selected data bins). Other data items for the derived attribute can have a second value indicating that the specified predictive output value is not present if the first and second attributes have values that do not correspond to one of the selected data bins (e.g., a pair of attribute values falling within one of the non-selected data bins).

The example depicted in FIG. 8 includes data bins that are selected in block 406 and used, in block 408, to define a derived attribute based on having a threshold support and confidence. In this example, the data bin 810 with the boundaries $2<x_1<3$ (i.e., $x_1$="high") and $1<x_2<2$ (i.e., $x_2$="low") includes data samples represented by dots 802, 804. The open dots 804 indicate data samples having a specified value of a predictive output (e.g., data samples with a "bad" value indicating that a customer is likely to be delinquent on a debt within two years), and the solid dots 802 indicate data samples that lack the specified value (e.g., data samples with a "good" value for delinquencies).

Figure 9:
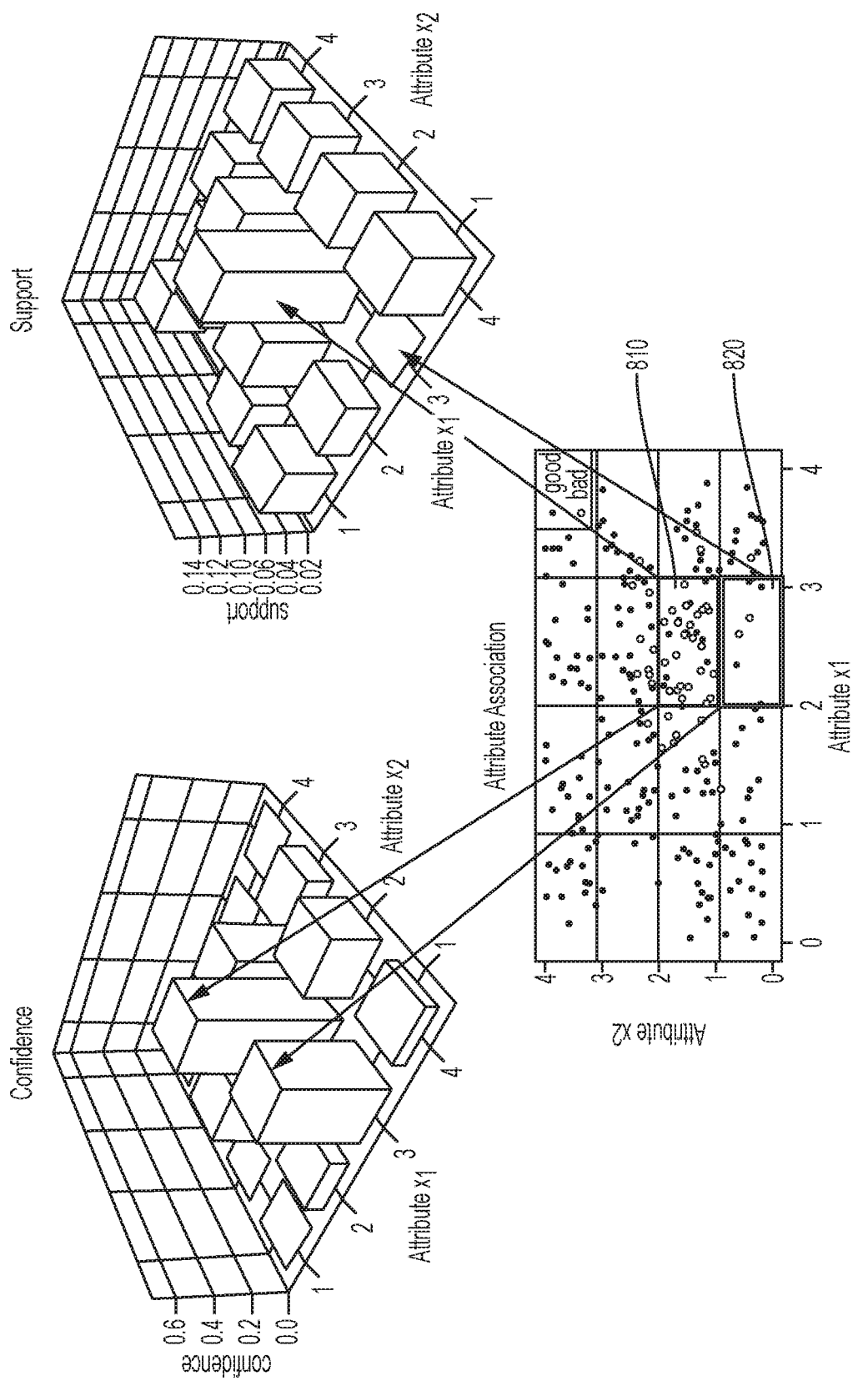
FIG. 9 depicts an example of a three-dimensional support graph and a three-dimensional confidence graph for the data bins depicted in FIG. 8.

In this example, a visual illustration of which is depicted in FIG. 9, the data bin 810 has a sufficient "support" score because the number of dots 802, 804 in this bin divided by the total number of dots 802, 804 is 10%, which is greater than a threshold support. FIG. 9 depicts the sufficient support score by a sufficiently tall bar in the three-dimensional "support" graph. The threshold support score indicates that the portion of the data samples located within the bin 810 is large enough, from a statistical or other analytical perspective, for the set of attribute value pairs represented by the data bin 810 to be predictive. Continuing with this example, the data bin 810 has a sufficient confidence score because the number of "bad" dots 804 in the bin 810 divided by the number of dots 802, 804 in the bin 810 is 70%, which is greater than or equal to a threshold confidence. FIG. 9 depicts the sufficient support score by a sufficiently tall bar in the three-dimensional "confidence" graph. The threshold confidence indicates that the attribute values included within the data bin have a correlation with the desired predictive output. Thus, a derived attribute has a value of "1" if values of the first and second attributes fall within this bin.

By contrast, in this example, a data bin 820 with the boundaries $2<x_1<3$ (i.e., $x_1$="high") and $0<x_2<1$ (i.e., $x_2$="lowest") in FIG. 8 fails to meet a threshold support level because the number of data samples is too low. For example, as depicted in FIGS. 8-9, even though the confidence score of 60% exceeds a threshold confidence, the portion of the data samples located within the bin 820 is too small, from a statistical or other analytical perspective, for the set of attribute value pairs represented by the data bin 820 to be predictive. Therefore, the data samples in the bin 820 do not indicate a relationship among the predictive output and the attributes $x_1$ and $x_2$. Similarly, a data bin with the boundaries $3<x_1<4$ (i.e., $x_1$="highest") and $0<x_2<1$ (i.e., $x_2$="lowest") fails to meet a threshold confidence level because the ratio between the number of "bad" samples and the total number of samples in the bin is too low. Even if the number of data samples within the bin provides sufficient support, the number of data samples with the specified predictive output value (i.e., "bad") is too low. Therefore, the data samples in this bin do not indicate a relationship among the predictive output and the attributes $x_1$ and $x_2$.

Figure 10:
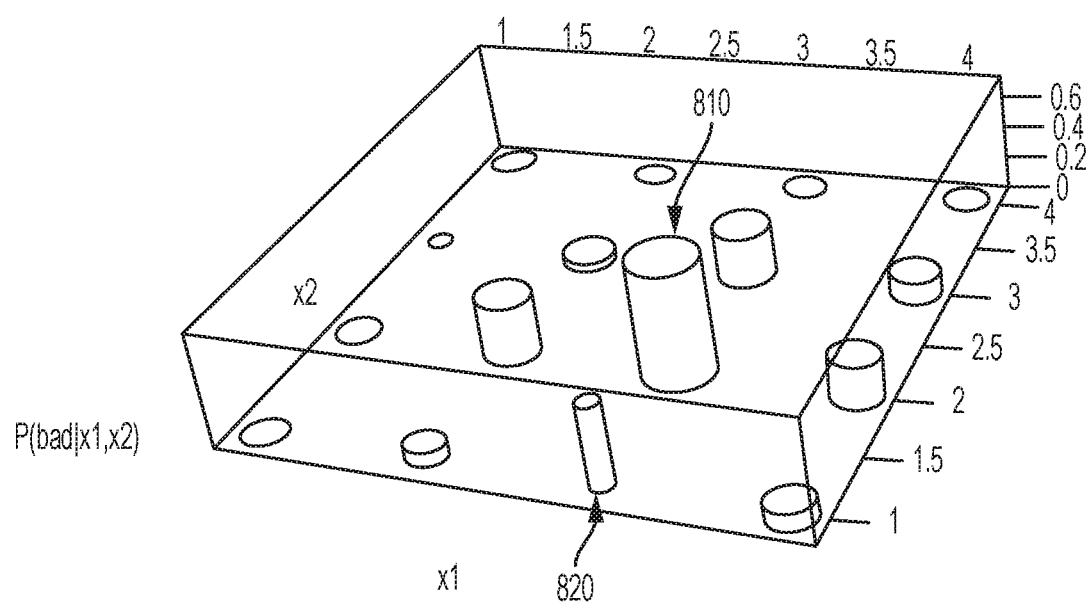
FIG. 10 depicts an example of a three-dimensional graph depicting both confidence and support for the data bins depicted in FIG. 8.

FIG. 10 depicts examples of visual representations of the attribute data and predictive output data in FIGS. 8-9. In FIG. 10, a given bin can be represented by a cylinder. A base of each cylinder can correspond to a support for the data bin. For example, a data bin with a larger percentage of the data samples (i.e., a greater "support") can be represented by a cylinder with a wider base, and vice versa. A height of each cylinder can correspond to a confidence for the data bin. For example, a data bin in which a larger percentage of the data samples within the bin have a specified predictive output value (e.g., a higher confidence of a "bad" value) can be represented by a cylinder with a greater height, and vice versa. A volume of the cylinder can represent a ratio between the number of data samples in the bin with a specified predictive output value and the number of data samples among all the bins. A given cylinder having a larger volume can indicate that the cylinder is more likely to meet threshold criteria for support and confidence.

A selected subset of data bins can have any number of bins. In the example described above, a derived attribute's value is determined based on one selected data bin. But other examples involve defining a derived attribute using multiple data bins. For instance, threshold levels of support and confidence may be present in multiple bins (e.g., if data samples with a specified predictive output value may not be concentrated in one data bin). In aspects in which a derived attribute is generated for multiple data bins, the multiple data bins are selected based on each bin having a threshold support, each bin having a threshold confidence, and the combined volume of the bins having a threshold volume.

Figure 11:
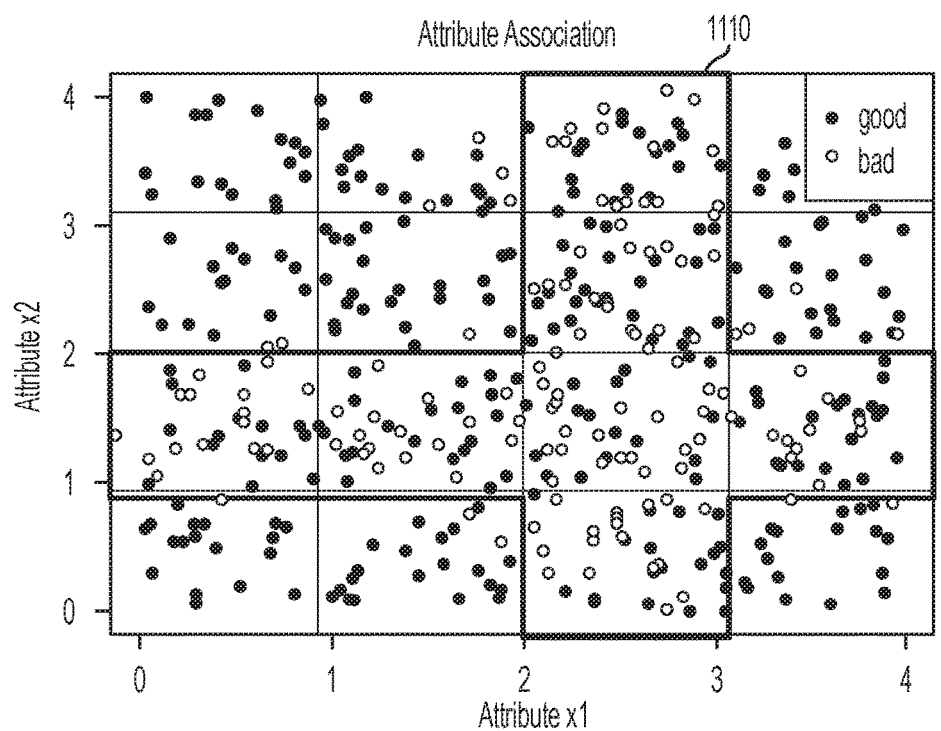
FIG. 11 depicts an example of a grouping of data bins generated from intersections of ordinal attributes according to one aspect of the present disclosure.
Figure 12:
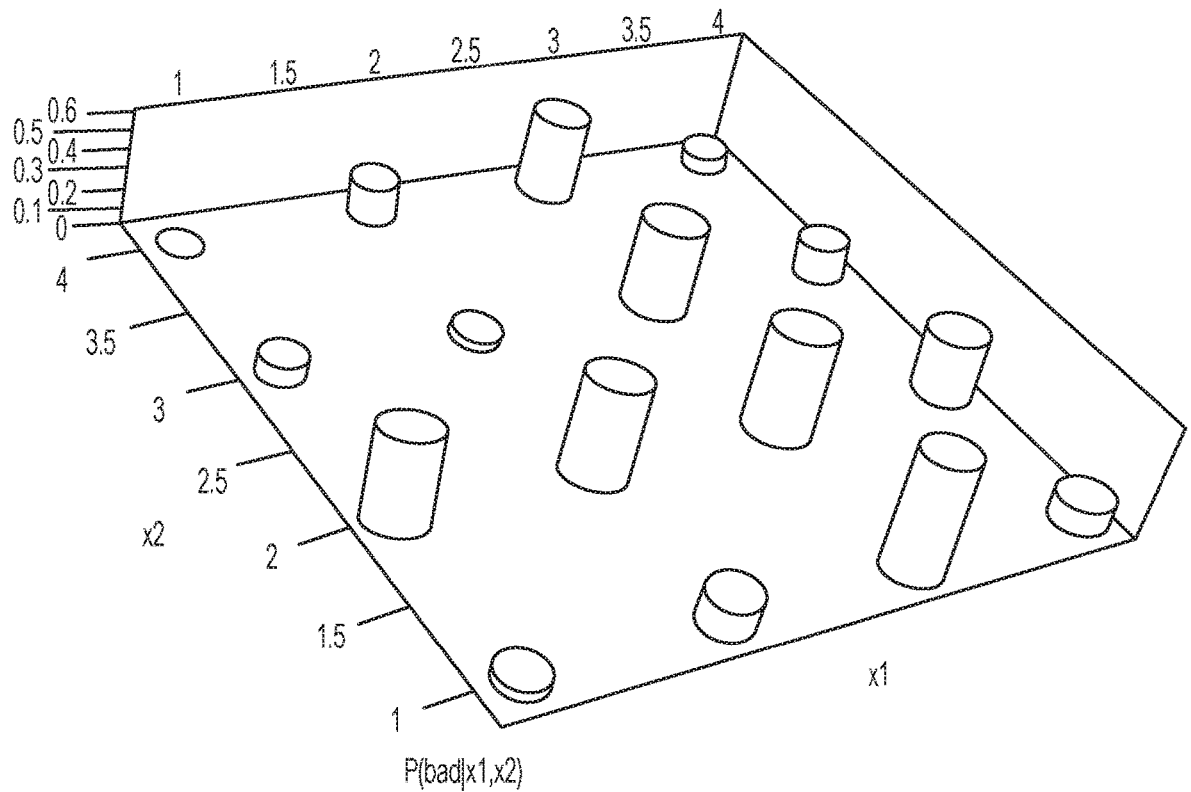
FIG. 12 depicts an example of a three-dimensional graph depicting both confidence and support for the data bins depicted in FIG. 11 according to one aspect of the present disclosure.

For example, FIGS. 11-12 depict an example in which a selected subset of data bins 1110 includes multiple data bins. Each of the selected data bins 1110 in the depicted example include a sufficient number of data samples to satisfy a threshold support criterion. Each of the selected data bins 1110 in the depicted example includes a sufficient percentage of data samples having a "bad" value to satisfy a threshold confidence criterion. In addition, the four data bins corresponding to a "high" value of $x_1$ satisfy a minimum sum-of-volumes criterion, and the four data bins corresponding to a "low" value of $x_2$ satisfy the minimum sum-of-volumes criterion. In this example, a derived attribute X may be a binary attribute whose value is determined by the following function:

If $x_1$="high" or $x_2$="low", then X=1,
Else X=0.

This function indicates that if values of attribute $x_1$ (e.g., an attribute 116) in the "high" range or values of attribute $x_2$ (e.g., an attribute 120) are in the "low" range, a specified predictive output will result.

The examples discussed above are provided for illustrative purposes. One or more of the features described above can be implemented in a different manner. For instance, in some aspects, more than two attributes can be used to generate a derived attribute. For example, instead of a data bin corresponding to an intersecting set of two attribute value ranges in a two-dimensional space, a data bin can correspond to an intersecting set of n attribute value ranges in an n-dimensional space.

In additional or alternative aspects, the data bins can be implemented differently. In one example, a number of data bins can be varied. In another example, data bins can be have non-uniform shapes. For instance, a bin shape can be adjusted using a regression tree or other suitable algorithm. Adjusting a bin shape can allow more data samples to be captured in a given bin, and thereby increase the likelihood of a given bin having sufficient support, sufficient confidence or both. This can allow derived attributes to more accurately reflect relationships among attributes and predictive outputs.

In additional or alternative aspects, the creation of derived attributes can be modified. In one example, multiple association rules can be used to create a derived attribute. In another example, one or more weights can be assigned to one or more association rules that are used to create a derived attribute. In another example, a dummy variable can be created for data bin. In another example, a confidence score can be used as a derived attribute.

The attribute-creation module 108 can be implemented using any suitable programing language. Examples of suitable programming languages include C, C++, R, Revolution R, Statistical Analysis System ("SAS"), etc. Examples of suitable rule-mining applications include Apriori, Frequent Itemset Mining, arules, etc.

Figures 13, 14:
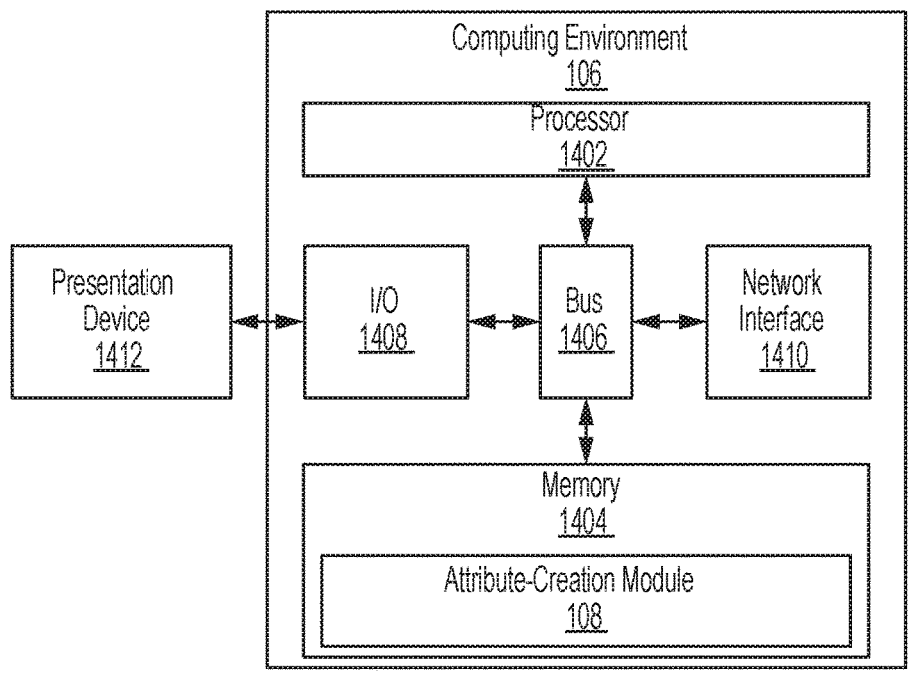
FIG. 13 depicts an example of a database that is modified using the process depicted in FIG. 4 according to one aspect of the present disclosure.
FIG. 14 depicts an example of a computing environment usable for creating derived attributes for training automated modeling algorithms or other machine-learning algorithms according to one aspect of the present disclosure.

FIG. 13 depicts an example of a database 110 that is modified using the process 400. In this simplified example, the database 110 includes a first table 1310 that includes data samples for the attribute 116, a second table 1320 that includes data samples for the attribute 120, and a third table 1330 that includes data samples for the response variable 124. Each of the three tables 1310, 1320, 1330 includes an "ID" column that includes an anonymous identifier for an individual or other entity (e.g., a consumer) who actions were used to generate the data samples for the attribute 116, the attribute 120, and the response variable 124. The three tables 1310, 1320, 1330 can be linked via identifier value in the "ID" column. For instance, each of the three tables 1310, 1320, 1330 includes identifiers for N entities. Executing the process 400 can involve creating or updating a fourth table 1340 depicted in FIG. 13. The fourth table 1340 includes an "ID" column that can link the fourth table 1340 to one or more of the other three tables 1310, 1320, 1330. The fourth table 1340 can also include a value that includes a value of the derived attribute 125 for a given "ID." The value of the derived attributes 125 (e.g., "1" or "0") can be determined as described herein.

Example of a Computing Environment for Attribute-Creation Operations

Any suitable computing system or group of computing systems can be used to perform the attribute-creation operations described herein. For example, FIG. 14 is a block diagram depicting an example of a computing environment 106. The example of the computing environment 106 can include various devices for communicating with other devices in the computing system 100, as described with respect to FIG. 1. The computing environment 106 can include various devices for performing one or more attribute-creation operations described above with respect to FIGS. 1-2, and 4-13.

The computing environment 106 can include a processor 1402 that is communicatively coupled to a memory 1404. The processor 1402 executes computer-executable program code stored in the memory 1404, accesses information stored in the memory 1404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 1402 include a microprocessor, an application-specific integrated circuit, a field-programmable gate array, or any other suitable processing device. The processor 1402 can include any number of processing devices, including one. The processor 1402 can include or communicate with a memory 1404. The memory 1404 stores program code that, when executed by the processor 1402, causes the processor to perform the operations described in this disclosure.

The memory 1404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing environment 106 may also include a number of external or internal devices such as input or output devices. For example, the computing environment 106 is shown with an input/output interface 1408 that can receive input from input devices or provide output to output devices. A bus 1406 can also be included in the computing environment 106. The bus 1406 can communicatively couple one or more components of the computing environment 106.

The computing environment 106 can execute program code that includes the attribute-creation module 108. The program code for the attribute-creation module 108 may be resident in any suitable computer-readable medium and may be executed on any suitable processing device. For example, as depicted in FIG. 14, the program code for the attribute-creation module 108 can reside in the memory 1404 at the computing environment 106. Executing the attribute-creation module 108 can configure the processor 1402 to perform the operations described herein.

In some aspects, the computing environment 106 can include one or more output devices. One example of an output device is the network interface device 1410 depicted in FIG. 14. A network interface device 1410 can include any device or group of devices suitable for establishing a wired or wireless data connection to one or more data networks 104. Non-limiting examples of the network interface device 1410 include an Ethernet network adapter, a modem, etc.

Another example of an output device is the presentation device 1412 depicted in FIG. 14. A presentation device 1412 can include any device or group of devices suitable for providing visual, auditory, or other suitable sensory output. Non-limiting examples of the presentation device 1412 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
    accessing a data structure that stores training data for training an automated modeling algorithm, wherein the training data includes first data for a first attribute and second data for a second attribute;
    modifying the data structure to include a derived attribute that indicates a joint relationship among the first attribute, the second attribute, and a predictive output variable, wherein modifying the data structure to include the derived attribute comprises:
grouping the first data and the second data into a set of data bins, wherein each data bin of the set of data bins is defined by a respective subset of values of the first attribute and a respective subset of values of the second attribute,
identifying, within each respective data bin, a respective number of data samples that have a specified predictive output value of the predictive output variable,
selecting a subset of the set of data bins based on (i) the respective number of data samples, within each respective data bin, that have the specified predictive output value, and (ii) a confidence level for each respective data bin indicating a ratio between a total number of the data samples within the respective data bin and the respective number of data samples that have the specified predictive output value,
generating a training dataset for the derived attribute based on the data samples within the subset of the data bins, wherein each training data item included in the training dataset has:
(i) a first value indicating a presence of the specified predictive output value in a first data sample included in the subset of the data bins, or
(ii) a second value indicating an absence of the specified predictive output value in a second data sample excluded from the subset of the data bins, and
updating the training data to include the training dataset for the derived attribute; and
training the automated modeling algorithm with the first data for the first attribute, the second data for the second attribute, and the training dataset for the derived attribute.

2. The method of claim 1, wherein modifying the data structure to include the derived attribute further comprises selecting the subset of the data bins based on each selected data bin having a threshold number of data samples and a threshold ratio between data samples in the data bin with the specified predictive output value and a total number of data samples in the data bin.

3. The method of claim 2, wherein selecting the subset of the data bins comprises:
determining that a support level for each selected data bin exceeds a threshold support level indicating that the selected data bin includes a number of the data samples that is sufficient for determining, using the selected data bin, trends in the specified predictive output value, wherein a bin having insufficient support is excluded from the subset of the data bins; and
determining that the confidence level for each selected data bin exceeds a threshold confidence level indicating that the selected data bin includes a number of the data samples having the specified predictive output value of the predictive output variable that is sufficient for determining an association between the selected data bin and the specified predictive output value.

4. The method of claim 3, wherein determining the support level for each selected data bin comprises computing, for each selected data bin, a ratio of a number of the data samples having the first attribute and the second attribute in a selected data bin to a total number of data samples in the selected data bin, wherein determining the confidence level for each selected data bin comprises computing, for each selected data bin, (i) a ratio of a number of data samples, in the selected data bin, having the first attribute, the second attribute, and the specified predictive output value to the total number of data samples in the selected data bin and (ii) the support level.

5. The method of claim 1, wherein generating the training dataset for the derived attribute comprises:
for a first data sample within a first data bin in the set of data bins, generating a first data item having a first value of a binary attribute, the first value indicating a presence of the specified predictive output value for the first data bin, wherein the first data bin corresponds to a first combination of values of the first attribute and the second attribute; and
for a second data sample within a second data bin in the set of data bins, generating a second data item having a second value of the binary attribute, the second value indicating an absence of the specified predictive output value for the second data bin, wherein the second data bin corresponds to a second combination of values of the first attribute and the second attribute.

6. The method of claim 1, wherein grouping the first data and the second data into the set of data bins comprises:
generating a first ordinal attribute from the first attribute; and
generating a second ordinal attribute from the second attribute,
wherein the first attribute and the second attribute are numerical attributes.

7. The method of claim 1, wherein accessing the data structure comprises retrieving the training data from a database that includes the first data and the second data, wherein the first data and the second data are each indexed to a respective identifier associated with a consumer whose activates were recorded to generate the training data, wherein the first data includes the first attribute representing credit utilization and the second data includes the second attribute representing credit limit, wherein the modeling algorithm is for producing a risk assessment model.

8. A non-transitory computer-readable medium in which instructions executable by a processing device are stored for causing the processing device to:
access a data structure that stores training data for training an automated modeling algorithm, wherein the training data includes first data for a first attribute and second data for a second attribute;
modify the data structure to include a derived attribute that indicates a joint relationship among the first attribute, the second attribute, and a predictive output variable, wherein causing the processing device to modify the data structure comprises causing the processing device to:
group the first data and the second data into a set of data bins, wherein each data bin of the set of data bins is defined by a respective subset of values of the first attribute and a respective subset of values of the second attribute;
identify, within each respective data bin, a respective number of data samples that have a specified predictive output value of the predictive output variable;
select a subset of the set of data bins based on (i) the respective number of data samples, within each respective data bin, that have the specified predictive output value, and (ii) a confidence level for each respective data bin indicating a ratio between a total number of the data samples within the respective data bin and the respective number of the data samples that have the specified predictive output value;

generate a training dataset for the derived attribute based on the data samples within the subset of the data bins, wherein each training data item included in the training dataset has:
(i) a first value indicating a presence of the specified predictive output value in a first data sample included in the subset of the data bins, or
(ii) a second value indicating an absence of the specified predictive output value in a second data sample excluded from the subset of the data bins; and update the training data to include the training dataset for the derived attribute; and train the automated modeling algorithm with the first data for the first attribute, the second data for the second attribute, and the training dataset for the derived attribute.

9. The non-transitory computer-readable medium of claim 8, wherein the instructions for causing the processing device to modify the data structure to include the derived attribute further comprises instructions executable by the processing device to select the subset of the data bins based on each selected data bin having a threshold number of data samples and a threshold ratio between data samples in the data bin with the specified predictive output value and a total number of data samples in the data bin.

10. The non-transitory computer-readable medium of claim 9, wherein the instructions for causing the processing device to select the subset of the data bins comprises instructions executable by the processing device to:
determine that a support level for each selected data bin exceeds a threshold support level indicating that the selected data bin includes a number of the data samples that is sufficient for determining, using the selected data bin, trends in the specified predictive output value, wherein a bin having insufficient support is excluded from the subset of the data bins; and
determine that the confidence level for each selected data bin exceeds a threshold confidence level indicating that the selected data bin includes a number of the data samples having the specified predictive output value of the predictive output variable that is sufficient for determining an association between the selected data bin and the specified predictive output value.

11. The non-transitory computer-readable medium of claim 10, wherein the instructions for causing the processing device to determine the support level for each selected data bin comprises instructions executable by the processing device to compute, for each selected data bin, a ratio of a number of the data samples having the first attribute and the second attribute in a selected data bin to a total number of data samples in the selected data bin, wherein the instructions for causing the processing device to determine the confidence level for each selected data bin comprises instructions executable by the processing device to compute, for each selected data bin, (i) a ratio of a number of data samples, in the selected data bin, having the first attribute, the second attribute, and the specified predictive output value to the total number of data samples in the selected data bin and (ii) the support level.

12. The non-transitory computer-readable medium of claim 8, wherein the instructions for causing the processing device to generate the training dataset comprises instructions executable by the processing device for causing the processing device to:
for a first data sample within a first data bin in the set of data bins, generate a first data item having a first value of a binary attribute, the first value indicating a presence of the specified predictive output value for the first data bin, wherein the first data bin corresponds to a first combination of values of the first attribute and the second attribute; and
for a second data sample within a second data bin in the set of data bins, generate a second data item having a second value of the binary attribute, the second value indicating an absence of the specified predictive output value for the second data bin, wherein the second data bin corresponds to a second combination of values of the first attribute and the second attribute.

13. The non-transitory computer-readable medium of claim 8, wherein the instructions for causing the processing device to group the first data and the second data into the set of data bins comprises instructions executable by the processing device for causing the processing device to:
generate a first ordinal attribute from the first attribute; and
generate a second ordinal attribute from the second attribute,
wherein the first attribute and the second attribute are numerical attributes.

14. The non-transitory computer-readable medium of claim 8, wherein the instructions for causing the processing device to access the data structure comprises instructions executable by the processing device for causing the processing device to retrieve the training data from a database that includes the first data and the second data, wherein the first data and the second data are each indexed to a respective identifier associated with a consumer whose activates were recorded to generate the training data, wherein the first data includes a first attribute representing credit utilization and the second data includes a second attribute representing credit limit.

15. A system comprising:
a processing device; and
a memory device on which instructions are stored that are executable by the processing device to:
access a data structure that stores training data for training an automated modeling algorithm, wherein the training data includes first data for a first attribute and second data for a second attribute;
modify the data structure to include a derived attribute that indicates a joint relationship among the first attribute, the second attribute, and a predictive output variable, wherein the instructions to modify the data structure comprise causing the processing device to:
group the first data and the second data into a set of data bins, wherein each data bin of the set of data bins is defined by a respective subset of values of the first attribute and a respective subset of values of the second attribute;
identify, within each respective data bin, a respective number of data samples that have a specified predictive output value of the predictive output variable;
select a subset of the set of data bins based on (i) the respective number of data samples, within each respective data bin, that have the specified predictive output value, and (ii) a confidence level for each respective data bin indicating a ratio between a total number of the data samples within the respective data bin and the respective number of data samples that have the specified predictive output value;

generate a training dataset for the derived attribute based on the data samples within the subset of the data bins, wherein each training data item included in the training dataset has:
(i) a first value indicating a presence of the specified predictive output value in a first data sample included in the subset of the data bins, or
(ii) a second value indicating an absence of the specified predictive output value in a second data sample excluded from the subset of the data bins; and updating the training data to include the training dataset for the derived attribute; and train the automated modeling algorithm with the first data for the first attribute, the second data for the second attribute, and the training dataset for the derived attribute.

16. The system of claim 15, wherein the instructions executable by the processing device to modify the data structure to include the derived attribute further comprises instructions executable by the processing device to select the subset of the data bins based on each selected data bin having a threshold number of data samples and a threshold ratio between data samples in the data bin with the specified predictive output value and a total number of data samples in the data bin.

17. The system of claim 16, wherein the instructions executable by the processing device to select the subset of the data bins comprise instructions executable by the processing device to:

compute, for each selected data bin, a support level indicating a ratio of a number of the data samples having the first attribute and the second attribute in a selected data bin to a total number of data samples in the selected data bin;

determine that the support level for each selected data bin exceeds a threshold support level indicating that the selected data bin includes a number of the data samples that is sufficient for determining, using the selected data bin, trends in the specified predictive output value, wherein a bin having insufficient support is excluded from the subset of the data bins; and determine that the confidence level for each selected data bin exceeds a threshold confidence level indicating that the selected data bin includes a number of the data samples having the specified predictive output value of the predictive output variable that is sufficient for determining an association between the selected data bin and the specified predictive output value.

18. The system of claim 15, wherein the instructions executable by the processing device to generate the training dataset comprises instructions executable by the processing device to:

for a first data sample within a first data bin in the set of data bins, generate a first data item having a first value of a binary attribute, the first value indicating a presence of the specified predictive output value for the first data bin, wherein the first data bin corresponds to a first combination of values of the first attribute and the second attribute; and for a second data sample within a second data bin in the set of data bins, generate a second data item having a second value of the binary attribute, the second value indicating an absence of the specified predictive output value for the second data bin, wherein the second data bin corresponds to a second combination of values of the first attribute and the second attribute.

19. The system of claim 15, wherein the instructions executable by the processing device to group the first data and the second data into the set of data bins comprises instructions executable by the processing device to:

generate a first ordinal attribute from the first attribute; and generate a second ordinal attribute from the second attribute, wherein the first attribute and the second attribute are numerical attributes.

20. The system of claim 15, wherein the instructions executable by the processing device to access the data structure comprises instructions for causing the processing device to retrieve the training data from a database that includes the first data and the second data, wherein the first data and the second data are each indexed to a respective identifier associated with a consumer whose activates were recorded to generate the training data, wherein the first data includes a first attribute representing credit utilization and the second data includes a second attribute representing credit limit.

* * * * *